United States Patent Office 2,809,202
Patented Oct. 8, 1957

2,809,202

N-CYANOETHYL BENZOTHIAZOLE SULFENAMIDES

Dwight L. Schoene, Woodbridge, and Norman K. Sundholm, Naugatuck, Conn., assignors to United States Rubber Company, New York, N. Y., a corporation of New Jersey No Drawing. Application July 27, 1954,
Serial No. 446,175

5 Claims. (Cl. 260—306.6)

This invention relates to new compositions of matter valuable as accelerators for the vulcanization of rubber or other vulcanizable rubber-like substances.

An object of the invention is to provide a new class of accelerators which have superior delayed action so that they can be used in rubber compounds reinforced with the very active (scorchy) furnace blacks. It is a further object to provide rubber compounds which can be processed at higher than the conventional temperatures before curing. Another object is to make available new compositions of matter.

The accelerators of the present invention comprise N-beta-cyanoethyl-2-benzothiazolesulfenamides represented by the structure

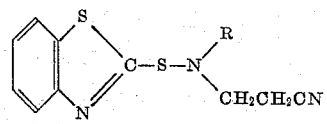

where R is a hydrogen atom, or an alkyl, alkenyl, cycloalkyl, aralkyl, or aryl radical. Examples of R are methyl, ethyl, beta-cyanoethyl, isopropyl, n-butyl, sec-butyl, tert-butyl, hexyl, octyl, decyl, dodecyl, allyl, cyclohexyl, methylcyclohexyl, benzyl, beta-phenethyl, phenyl, p-anisyl o-tolyl, and similar radicals.

These N-beta-cyanoethyl-2-benzothiazolesulfenamides are readily prepared by the reaction of 2-benzothiazolesulfenyl chloride with 2 molecular proportions of a beta-aminopropionitrile illustrated by the equation

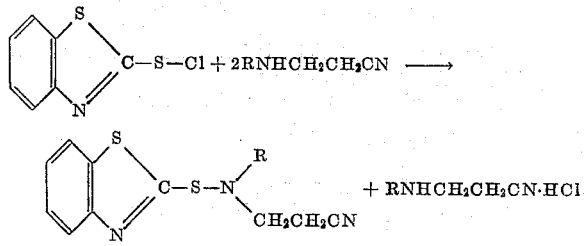

The amino nitrogen atom of the beta-aminopropionitrile must be attached to at least one hydrogen atom. Compounds of this type are prepared readily by the reaction of ammonia or a primary amine with acrylonitrile illustrated by:

$$RNH_2 + CH_2=CH-CN \rightarrow RNH-CH_2CH_2CN$$

where R is H or hydrocarbon. Examples of beta-aminopropionitriles which can be used to prepare the compounds of this invention are beta-aminopropionitrile, beta-methylaminopropionitrile, beta-isopropylaminopropionitrile, beta-cyclohexylaminopropionitrile, beta-benzylaminopropionitrile, beta-anilinopropionitrile, bis(beta-cyanoethyl) amine, and the like.

The 2-benzothiazolesulfenyl chloride used may be prepared by the chlorination of benzothiazolyl disulfide in an organic solvent as shown by U. S. patent to W. E. Messer No. 2,257,974.

Examples of N-beta-cyanoethyl-2-benzothiazolesulfenamides and their preparation and properties are as follows:

*Example 1.—N-isopropyl-N-beta-cyanoethyl-2-benzothiazolesulfenamide*

Chlorine (14.5 grams) was passed in above a stirred suspension of 68 grams of technical benzothiazolyl disulfide in 500 ml. of anhydrous ethylene chloride at 25–30° C. during 30 minutes. The resulting dark red solution of 2-benzothiazolesulfenyl chloride was added dropwise to a stirred solution of 89.6 grams of beta-isopropylaminopropionitrile in 200 ml. of anhydrous ethylene chloride during two and one-half hours. The reaction mixture was kept at 19–21° C. by the use of an ice-water bath. After stirring for 30 minutes sufficient water was added with stirring to dissolve the beta-isopropylaminopropionitrile hydrochloride formed during the reaction. The organic layer was separated from the water layer and the ethylene chloride removed. The residual product weighed 106 grams (95% of theory) and melted at 80–83° C. The material was purified by recrystallization from 75% ethanol and then from ligroin (B. P. 60–90° C.) using decolorizing carbon to give colorless crystals melting at 84.5° C.

Analysis.— Calculated for $C_{13}H_{15}N_3S_2$: N, 15.16. Found: N, 14.82.

The remaining examples were prepared using the above procedure.

*Example 2.—N-methyl-N-beta-cyanoethyl-2-benzothiazolesulfenamide*

This compound was prepared from 2-benzothiazolesulfenyl chloride and beta-methylaminopropionitrile. It was obtained as an oil.

Analysis.—Calculated for $C_{11}H_{11}N_3S_2$: N, 16.87; S, 25.70. Found: N, 16.09; S, 25.45.

*Example 3.—N-cyclohexyl-N-beta-cyanoethyl-2-benzothiazolesulfenamide*

This compound was prepared from 2-benzothiazolesulfenyl chloride and beta-cyclohexylaminopropionitrile. It was purified by recrystallization from ligroin (B. P. 60–90° C.) and then from acetone to give colorless crystals melting at 77–78.5° C.

Analysis.—Calculated for $C_{16}H_{19}N_3S_2$: N, 13.25; S, 20.19. Found: N, 12.75; S, 20.21.

*Example 4.—N-benzyl-N-beta-cyanoethyl-2-benzothiazolesulfenamide*

This compound was prepared from 2-benzothiazolesulfenyl chloride and beta-benzylaminopropionitrile. It was purified by recrystallization from ethanol using decolorizing carbon to give colorless crystals melting at 69.5–70.5° C.

Analysis.— Calculated for $C_{17}H_{15}N_3S_2$: N, 12.92. Found: N, 12.60.

*Example 5.—N-phenyl-N-beta-cyanoethyl-2-benzothiazolesulfenamide*

This compound was prepared from 2-benzothiazolesulfenyl chloride and beta anilinopropionitrile. It was purified by recrystallization from ethanol and then from benzene to give colorless crystals melting at 149° C.

Analysis.— Calculated for $C_{16}H_{13}N_3S_2$: N, 13.50. Found: N, 13.28.

*Example 6.—N,N-bis(beta-cyanoethyl)-2-benzothiazolesulfenamide*

This compound was prepared from 2-benzothiazolesulfenyl chloride and bis(beta-cyanoethyl)amine. It was purified by recrystallization from ethanol using decolorizing carbon to give colorless crystals melting at 110° C.

*Analysis.*—Calculated for $C_{13}H_{12}N_4S_2$: N, 19.44. Found: N, 19.03.

To demonstrate the utility of these new compositions of matter as accelerators for the vulcanization of rubber, examples were incorporated into the following formula:

| | Parts by weight |
|---|---|
| Smoked sheet | 100 |
| Super abrasion furnace black | 45 |
| Zinc oxide | 5 |
| Zinc salts of cocoanut oil acids | 3.5 |
| Pine tar | 3.5 |
| Antioxidant | 2.0 |
| Sulfur | 2.25 |
| Accelerator | 0.5 |

Stocks were compounded containing as the accelerator the following:

| Stock | Accelerator |
|---|---|
| A | Benzothiazolyl disulfide. |
| B | N-Methyl-N-beta-cyanoethyl-2-benzothiazole-sulfenamide. |
| C | N-Isopropyl-N-beta-cyanoethyl-2-benzothiazole-sulfenamide. |
| D | N-Cyclohexyl-N-beta-cyanoethyl-2-benzothiazole-sulfenamide. |
| E | N-Benzyl-N-beta-cyanoethyl-2-benzothiazole-sulfenamide. |
| F | N,N-bis(beta-Cyanoethyl)-2-benzothiazolesulfenamide. |

The stocks were cured by heating in a press at 292° F. for various periods of time. The physical properties of the respective stocks at the respective curing times are given in the following table:

| Stock | Cure Time, min. | 300% Modulus, p. s. i. | Tensile at break, p. s. i. | Elongation at break, percent |
|---|---|---|---|---|
| A | 15 | 880 | 3,550 | 670 |
| B | 15 | 740 | 2,930 | 610 |
| C | 15 | 400 | 1,800 | 660 |
| D | 15 | 260 | 1,450 | 650 |
| E | 15 | 340 | 1,910 | 640 |
| F | 15 | 330 | 1,530 | 420 |
| A | 60 | 1,670 | 4,180 | 580 |
| B | 60 | 1,600 | 4,370 | 620 |
| C | 60 | 1,730 | 4,130 | 570 |
| D | 60 | 1,630 | 4,090 | 580 |
| E | 60 | 1,330 | 3,860 | 680 |
| F | 60 | 1,540 | 4,150 | 630 |

The data obtained after curing for 60 minutes show these new compositions of matter to be excellent accelerators. The low degrees of cure after 15 minutes when compared to benzothiazolyl disulfide in stock A show them to have superior delayed action.

In order to demonstrate further the delayed action of these new accelerators, the scorch times of these stocks were measured on the Mooney viscometer at 250° F. and 280° F.

| Stock | Scorch time at— 250° F., Min. | Scorch time at— 280° F., Min. |
|---|---|---|
| A | 20 | 9½ |
| B | 32 | 12½ |
| C | 52 | 14¾ |
| D | 52 | 14½ |
| E | 47 | 13½ |
| F | 51 | 14½ |

These accelerators may be used to accelerate the vulcanization of any of the natural or synthetic rubbers which ordinarily lend themselves to cure with sulfur or other curing agent whose curing action is susceptible to acceleration, and which include the rubber-like homopolymers of butadiene-1,3 and substituted butadienes, and rubbery copolymers of the same with aryl olefins such as styrene, with acrylic compounds such as methyl acrylate, methyl methacrylate and acrylonitrile, as well as with isobutylene, methyl vinyl ether, mono-vinylpyridines, vinylidene chloride, etc. Better known synthetic rubbers are neoprene, butadiene-styrene (GR–S), and butadiene-acrylonitrile (GR–A). Accordingly, the expression "a rubber" refers to such natural and artificial rubbers.

The new accelerators may be added to the rubber by mill incorporation, by impregnation, by addition to latex, or other dispersions thereof, and the stocks may be subjected either to mold cures, air cures, submarine cures, steam cures, etc. Further, various compounding ingredients, such as fillers, pigments, softeners, antioxidants, etc., may be added.

The accelerators may be cured with or without the aid of conventional accelerator activators, e. g., diphenylguanidine, or in conjunction with other conventional accelerators (e. g., mercaptobenzothiazole or benzothiazolyl disulfide).

The proportions of the accelerator may be the same as, and need not exceed the proportions in which other conventional rubber accelerators are used, and are usually from 0.2 to 3 percent, based on the rubber component.

Having thus described our invention, what we claim and desire to protect by Letters Patent is:

1. Compounds represented by the formula

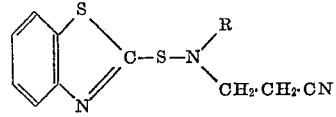

where R is a member selected from the class consisting of aliphatic hydrocarbon radicals having from 1 to 12 carbon atoms, cyclohexyl, and methylcyclohexyl.

2. N-isopropyl-N-beta-cyanoethyl-2-benzothiazolesulfenamide.

3. N-cyclohexyl-N-beta-cyanoethyl-2-benzothiazole-sulfenamide.

4. Compounds represented by the formula

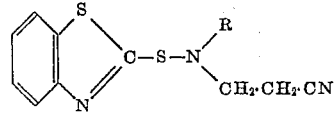

where R represents an aliphatic hydrocarbon radical having from 1 to 12 carbon atoms.

5. Compounds represented by the formula

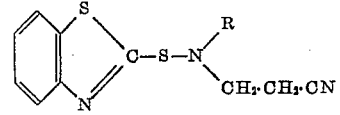

where R represents an alkyl hydrocarbon radical having from 1 to 12 carbon atoms.

References Cited in the file of this patent

UNITED STATES PATENTS

| | | |
|---|---|---|
| 2,367,827 | Smith | Jan. 23, 1945 |
| 2,407,138 | Clifford et al. | Sept. 3, 1946 |
| 2,560,045 | Smith | July 10, 1951 |
| 2,581,936 | Carr | Jan. 8, 1952 |
| 2,585,155 | Mingasson | Feb. 12, 1952 |
| 2,695,904 | Cooper | July 31, 1952 |